United States Patent [19]

Jones

[11] 4,132,256

[45] Jan. 2, 1979

[54] GUIDE FOR CUTTING APPARATUS

[76] Inventor: John C. Jones, 719 Summit Ave., Waukesha, Wis. 53186

[21] Appl. No.: 808,835

[22] Filed: Jun. 22, 1977

[51] Int. Cl.² ............................................. B27C 5/04
[52] U.S. Cl. ................................. 144/253 F; 83/446; 144/242 E
[58] Field of Search ........... 144/242 R, 242 A, 253 R, 144/253 F, 253 G, 253 J, 242 E; 83/420, 446, 449

[56] References Cited

U.S. PATENT DOCUMENTS

| | | | |
|---|---|---|---|
| 156,104 | 10/1874 | Russell | 144/253 F |
| 368,268 | 8/1887 | Adam | 83/446 X |
| 475,782 | 5/1892 | Luger | 144/253 F |
| 1,022,176 | 4/1912 | Boothby | 144/253 F |
| 2,525,894 | 10/1950 | Graham | 144/253 F |

FOREIGN PATENT DOCUMENTS 639869   3/1928   France .................................. 144/253 F Primary Examiner—Othell M. Simpson
Assistant Examiner—W. D. Bray
Attorney, Agent, or Firm—Henry C. Fuller

[57] ABSTRACT

A cutting guide for urging work material against the rip fence of a circular saw, joiner, shaper, or the like, includes a mounting block which is clamped to the work table with the mounting block provided with two spring steel bands arranged in loops and mounted in overlapping relation to each other on the mounting block. The spring bands are angled to provide a lead-in in the direction of work feed.

4 Claims, 3 Drawing Figures

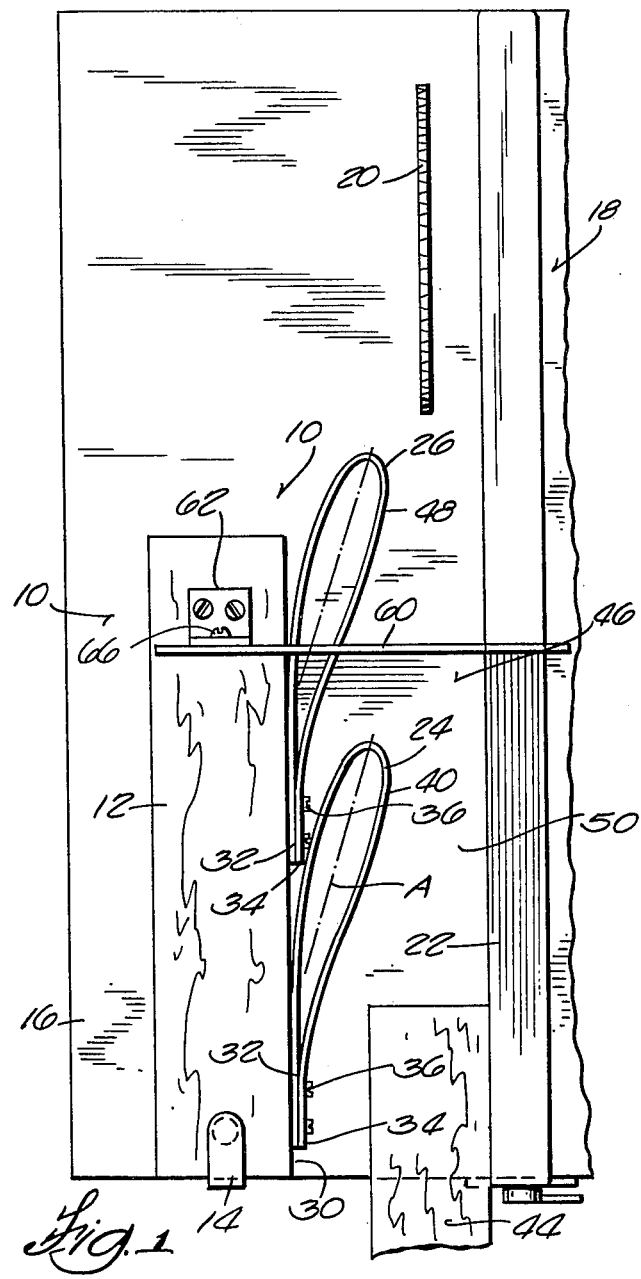
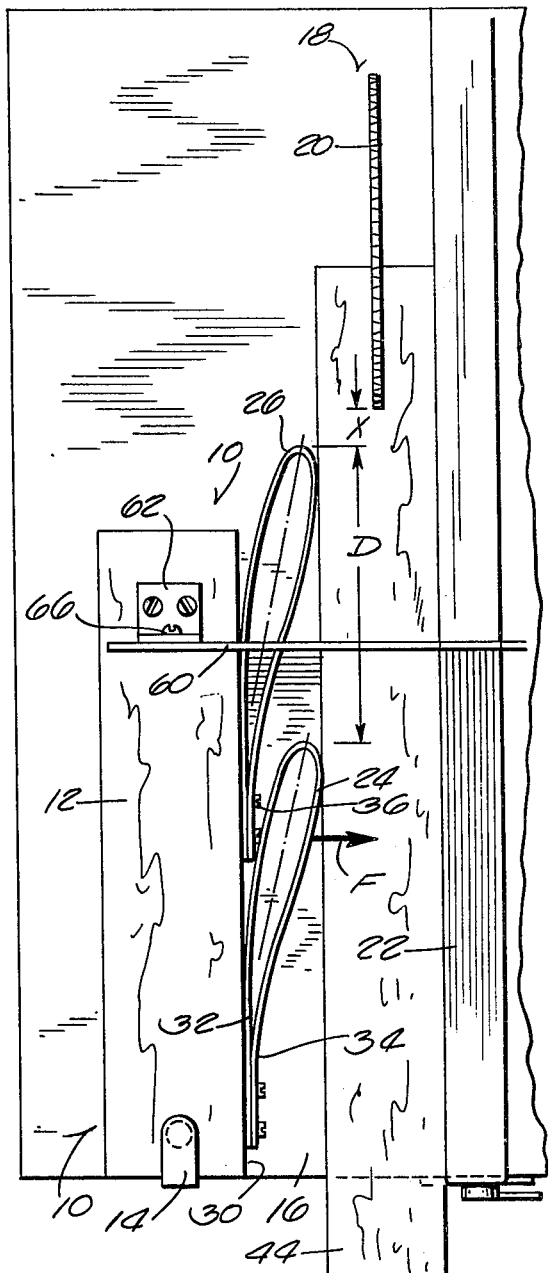
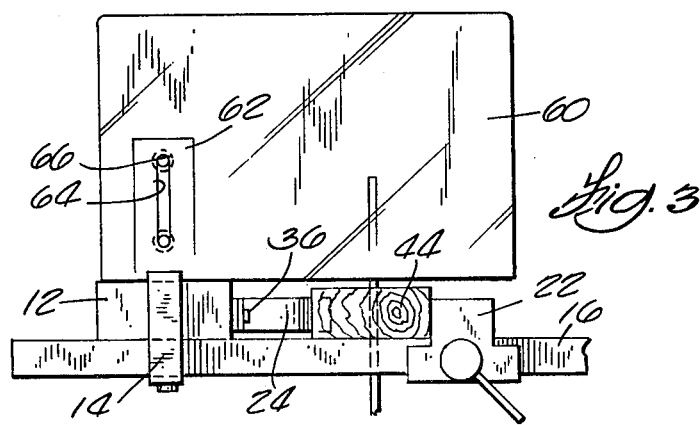

GUIDE FOR CUTTING APPARATUS

BACKGROUND OF THE INVENTION

In using power wood cutting machinery such as circular saws, joiners, radial arm saws, or shapers, it is desirable to hold the work firmly against the rip fence on the machine to provide accurate and safe cutting. U.S. Pat. Nos. 2,525,894; 183,418; 2,699,804; 3,685,556; 156,104; and 2,737,986 show various types of spring guides to accomplish this result. Various of these patents require modifications of the machine to adapt the machine for use of the guides and also involve more elaborate hardware and expensive construction details.

SUMMARY OF THE INVENTION

The cutting guide of the invention minimizes the expense for such a cutting guide and does not require any special adaptation or modification of the cutting machine for use of the guide. The guide has a mounting block which is clamped to the table of the circular saw or shaper. Spring steel bands are arranged in overlapping loops, with the loops extending at an angle relative to the cutting path to permit lead-in of the work piece. The use of two loops with one of the loops close to the cutting tool or saw blade insures that the tail of the work piece is firmly held against the rip fence until the cutting operation is almost completed. The mounting block for the steel spring loops can also be provided with a vertically adjustable chip shield.

Further objects, advantages and features of the invention will become apparent from the disclosure hereof.

DESCRIPTION OF THE DRAWINGS

FIG. 1 is a plan view of the cutting guide of the invention showing the work material being advanced.

FIG. 2 is a view similar to FIG. 1 showing the work material in a cutting position.

FIG. 3 is an end view of the cutting guide of the invention.

DESCRIPTION OF THE PREFERRED EMBODIMENT

Although the disclosure hereof is detailed and exact to enable those skilled in the art to practice the invention, the physical embodiments herein disclosed merely exemplify the invention which may be embodied in other specific structure. The scope of the invention is defined in the claims appended hereto.

The cutting guide 10 includes a mounting block 12 which can be a block of wood having a sufficient length to accommodate at least two spring loops as hereinafter discussed. The mounting block can be clamped by one or more clamps 14 to the work table 16 of a circular saw 18. The circular saw 18 has a blade 20 and an adjustable rip fence 22.

The cutting guide is provided with two or more steel band spring loops 24, 26. Means are provided for securing the spring loops 24 and 26 to the side 30 of the mounting block 12. In the disclosed construction, the means comprises registrable apertures 32 adjacent the ends 34 of the steel bands and fasteners 36, which can be screws which extend into the mounting block 12.

As disclosed in FIG. 1, the bight 40 of loop 24 overlaps the ends 34 of loop 26. The extent of overlap of the spring loops 24 and 26 is determined in part by the length of the work material will be handled. With short pieces of wood the distance D should be less and should be a distance such that both loops will be engaged with the work material 44 at the same time to provide good control. As shown in FIGS. 1 and 2, when the work material 44 is fed into the space 46 between the rip fence 22 and the band 24, the spring loops 24, 26 are slightly compressed and provide a biasing force in the direction of F to urge the work material against the rip fence 22.

It is also desirable to have the distance X between the bight 48 of loop 26 and the blade 20 at a relatively small distance to insure that there is a biasing force urging the work 44 against the fence 22 until the cutting is almost completed.

The loops 24 and 26 are oriented with the longitudinal axis A of the loops at a slight angle relative to the rip fence so that the work material is easily and progressively led into the gap 50 between loops and the fence 22 with a minimal deflection of the loop 24. As the work is fed into the gap 50 the loops compress and their axes deflect. It takes less pressure of the work piece on the loops to cause deflection of the axes of the loops than to compress the loops. Thus, where only a light cut is to be made on the work piece, and only a minimal biasing action of the loops is required, the guide block 12 can be positioned relative to the rip fence 22 so that the loops 24, 26 will be merely deflected rather than compressed.

Although the cutting guide is illustrated in use with a table saw with a circular blade, the cutting guide can be employed with any appropriate wood working machinery where it is desirable to hold the work piece firmly against a guiding fence.

The guide block 12 can also be provided with a chip deflector 60 in the form of a plastic sheet which is vertically adjustably mounted on a bracket 62. A vertical slot 64 in the bracket and screws or bolts 66 extending through the slot 64 and deflector provide height adjustment capability.

What I claim is:

1. A cutting guide for urging work material against a cutting fence comprising a mounting block having a side, a pair of spring bands, means for mounting the ends of said spring bands together and independently on said mounting block at a point remote from said loop ends to form closed loops and to provide a loop deflection axis to afford both deflection of the axes of said loops and compression of said loops upon pressure from a work piece with said loops being mounted in overlapping relationship to provide lateral biasing forces at spaced points on a work piece with less pressure being required to cause deflection of said loops than compression thereof.

2. A cutting guide in accordance with claim 1 wherein said mounting means for said bands comprises apertures in ends of said bands and fasteners extending through said apertures to secure said bands to said mounting block side.

3. The device of claim 1 including a chip shield and means for adjustably mounting said chip shield on said mounting block.

4. The device of claim 1 wherein the longitudinal axes of the loops is at an angle relative to the cutting feed path.

* * * * *